US010936427B2

United States Patent
Candee et al.

(10) Patent No.: US 10,936,427 B2
(45) Date of Patent: Mar. 2, 2021

(54) DISASTER RECOVERY DATA FETCHING CONTROL

(71) Applicant: International Business Machines Corporation, Armonk, NY (US)

(72) Inventors: Juliet Candee, Brewster, NY (US); Jes Kiran Chittigala, Hyderabad (IN); Ravi A. Shankar, Austin, TX (US); Bradley J. Smith, Tucson, AZ (US); Taru Varshney, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 16 days.

(21) Appl. No.: 16/154,975

(22) Filed: Oct. 9, 2018

(65) Prior Publication Data

US 2020/0110669 A1    Apr. 9, 2020

(51) Int. Cl.
*G06F 11/14* (2006.01)
*G06F 12/0862* (2016.01)
*G06F 12/16* (2006.01)

(52) U.S. Cl.
CPC ...... *G06F 11/1451* (2013.01); *G06F 11/1415* (2013.01); *G06F 12/0862* (2013.01); *G06F 12/16* (2013.01)

(58) Field of Classification Search
CPC ............. G06F 11/1415; G06F 11/1435; G06F 11/1451; G06F 11/1466; G06F 12/0862
USPC ........... 707/637, 646; 711/162; 714/4.11, 6.1
See application file for complete search history.

(56) References Cited

U.S. PATENT DOCUMENTS

| 6,163,856 | A | 12/2000 | Dion et al. |
| 6,381,605 | B1 | 4/2002 | Kothuri et al. |
| 8,121,966 | B2 | 2/2012 | Routray et al. |
| 8,341,363 | B2 * | 12/2012 | Chou ................. G06F 11/1448 707/640 |
| 9,384,207 | B2 | 7/2016 | Provenzano et al. |
| 2002/0138695 | A1 | 9/2002 | Beardsley et al. |
| 2005/0044097 | A1 | 2/2005 | Singson et al. |
| 2006/0123019 | A1 | 6/2006 | Nguyen et al. |
| 2008/0126431 | A1 * | 5/2008 | Walliser ............. G06F 11/1451 |

(Continued)

OTHER PUBLICATIONS

Anonymous, "HTTP ETag", Wikipedia, retrieved from the Internet: https://en.wikipedia.org/wiki/HTTP_ETag2 of, Apr. 16, 2018, 3 pages.

(Continued)

*Primary Examiner* — Gary J Portka
(74) *Attorney, Agent, or Firm* — Cantor Colburn LLP; Teddi Maranzano

(57) ABSTRACT

Aspects include prefetching a plurality of high-level information, high-level metadata, low-level metadata, and low-level information including a plurality of components associated with a monitored entity for disaster recovery. A subsequent instance of the high-level information, the high-level metadata, and the low-level metadata is requested. The subsequent instance of the high-level information is fetched based on detecting a change in the high-level metadata. A subsequent instance of one or more of the components of the low-level information corresponding to one or more changes in the low-level metadata is fetched for updating a plurality of disaster recovery data of the monitored entity in a persistent database.

14 Claims, 6 Drawing Sheets

(56) References Cited

U.S. PATENT DOCUMENTS

| | | |
|---|---|---|
| 2010/0115332 A1 | 5/2010 | Zheng et al. |
| 2011/0161723 A1 | 6/2011 | Taleck et al. |
| 2013/0145010 A1 | 6/2013 | Luna et al. |
| 2015/0112939 A1* | 4/2015 | Cantwell ............ G06F 11/1451 707/646 |
| 2015/0317209 A1* | 11/2015 | Hsu .................... G06F 11/1438 707/646 |

OTHER PUBLICATIONS

Mohan et al., "Algorithms for the management of remote backup data bases for disaster recovery," Proceedings of IEEE 9th International Conference on Data Engineering, Apr. 1993, 8 pages.

* cited by examiner

DISASTER RECOVERY DATA FETCHING CONTROL

BACKGROUND

The present invention generally relates to computer systems and, more specifically, to disaster recovery data fetching control.

Discovery of data for disaster recovery support can be time-consuming where large volumes of data distributed in various locations may need to be collected and stored persistently to cover many different aspects of a computer system. As data values change over time and resources, such as disks, are added or removed from a computer system, data collection is repeated at intervals to ensure that sufficient data is captured to restore computer system operation in the event of a catastrophic failure. Recovery support data is typically stored at a remote location, which consumes both network bandwidth and storage capacity to maintain data needed to restore system operation should a failure occur.

SUMMARY

According to one or more embodiments of the present invention, a computer-implemented method includes prefetching a plurality of high-level information, high-level metadata, low-level metadata, and low-level information including a plurality of components associated with a monitored entity for disaster recovery. A subsequent instance of the high-level information, the high-level metadata, and the low-level metadata are requested. The subsequent instance of the high-level information is fetched based on detecting a change in the high-level metadata. A subsequent instance of one or more of the components of the low-level information corresponding to one or more changes in the low-level metadata is fetched for updating a plurality of disaster recovery data of the monitored entity in a persistent database.

Other embodiments of the invention implement the features of the above-described method in a computer system and in a computer program product.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
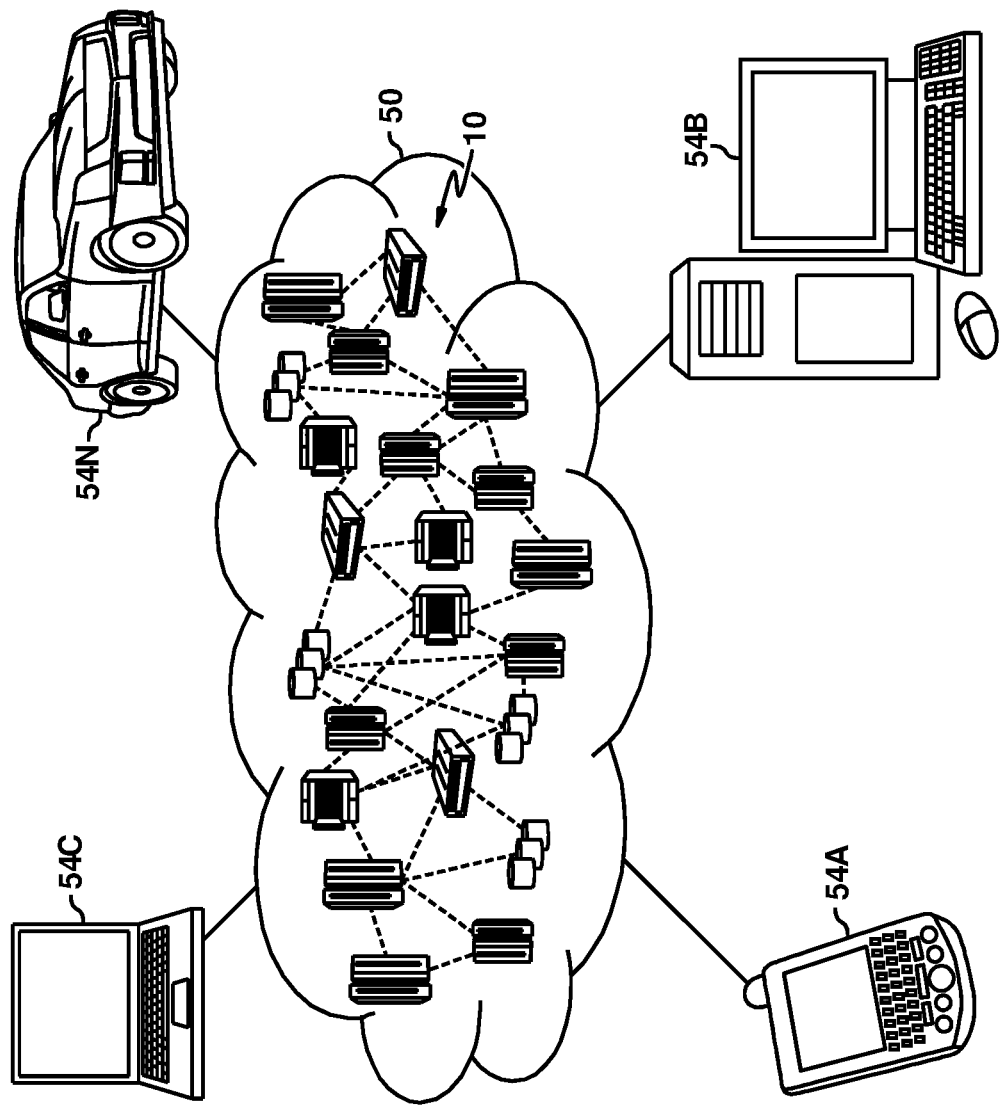
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

One or more embodiments of the present invention can be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
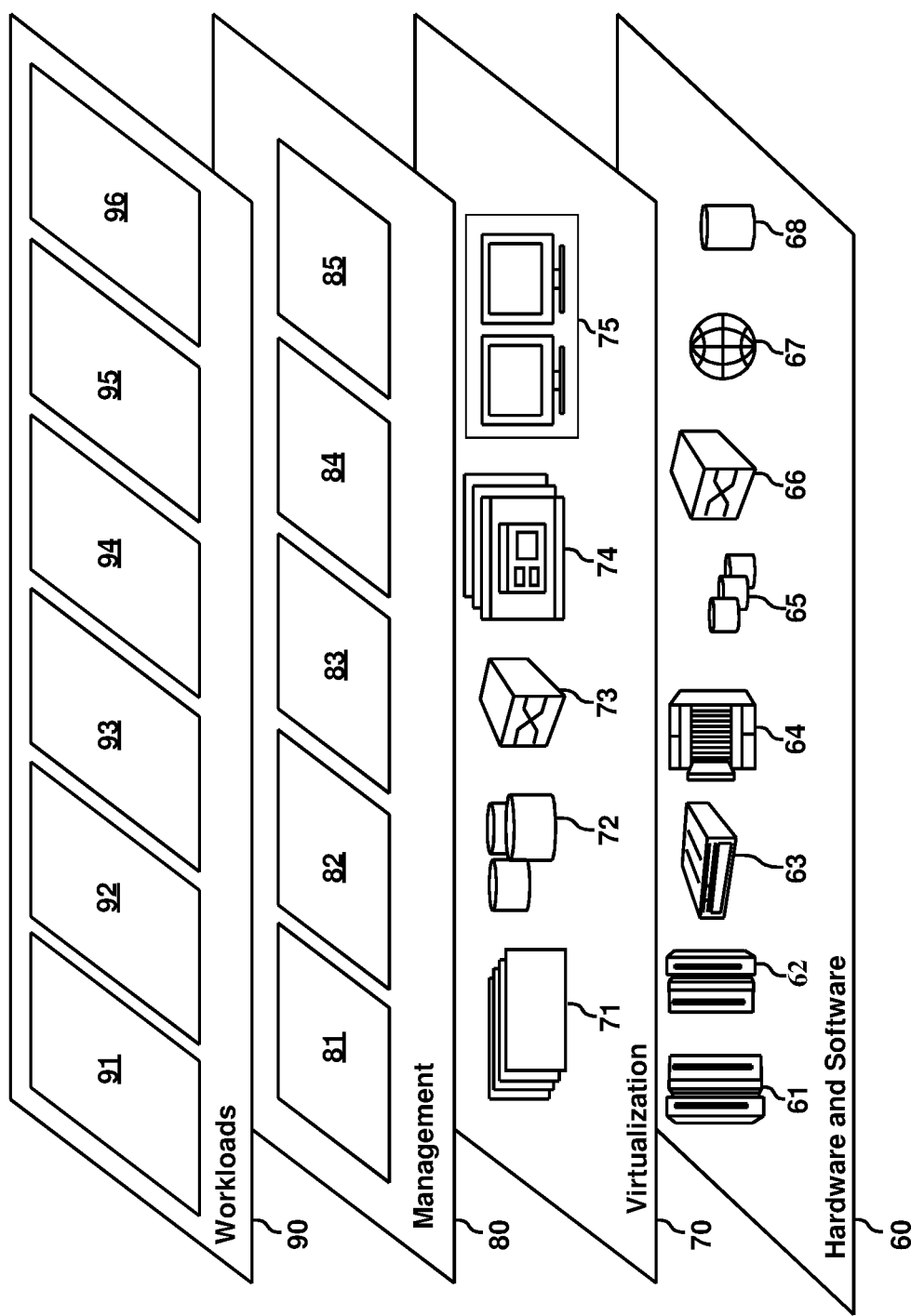
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and disaster recovery support 96. The disaster recovery support 96 can include functions associated with monitoring for updates in the contents of system data as further described herein.

Figure 3:
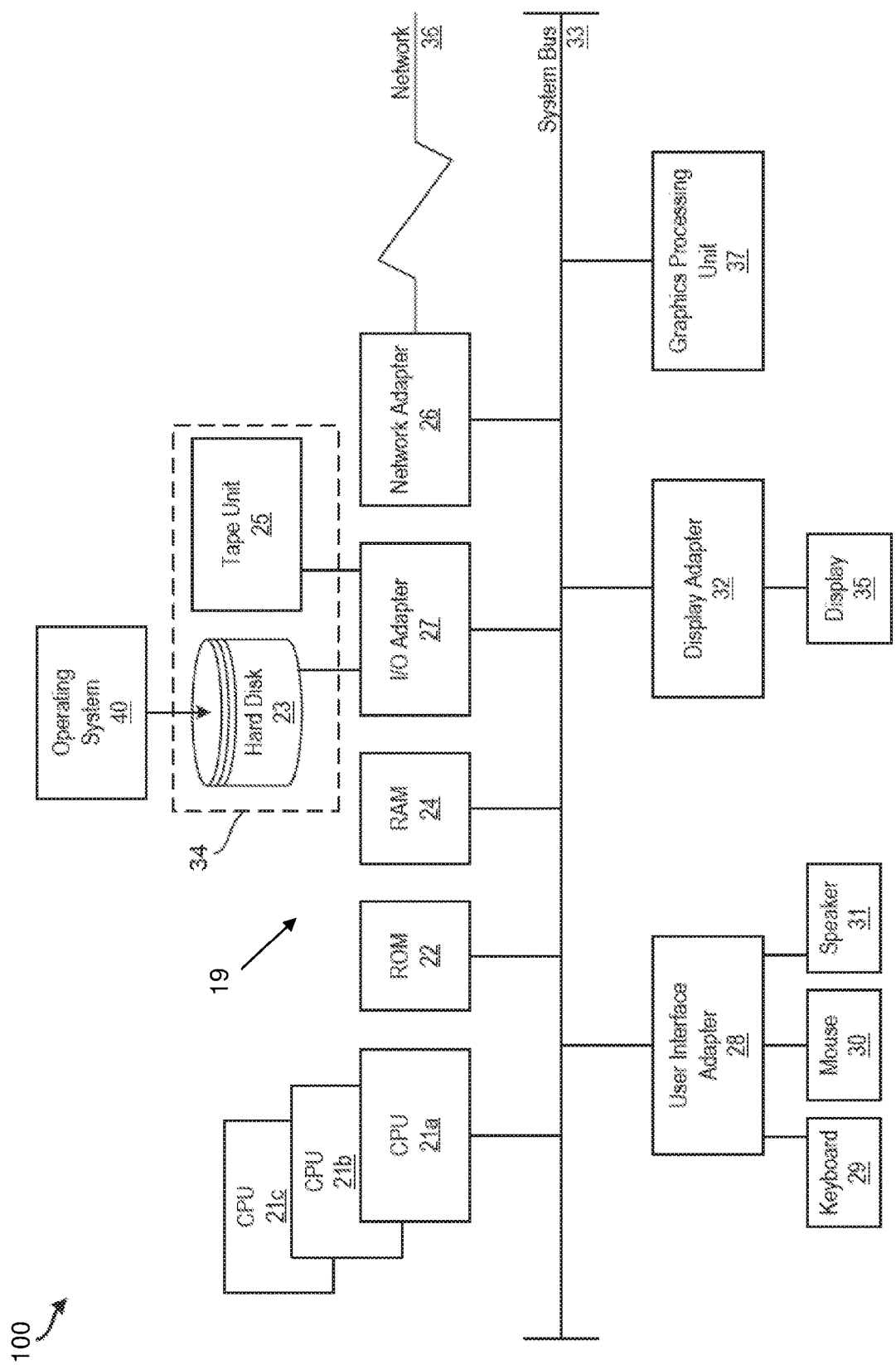
FIG. 3 depicts a block diagram of a processing system for implementing embodiments of the present invention.

It is understood that one or more embodiments of the present invention are capable of being implemented in conjunction with any other type of computing environment now known or later developed. For example, FIG. 3 depicts a block diagram of a processing system 100 for implementing the techniques described herein. The processing system 100 is an example of a computing node 10 of FIG. 1. In examples, processing system 100 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 100.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage drive 25 are collectively referred to herein as mass storage 34. Operating system 40 for execution on processing system 100 can be stored in mass storage 34. The ROM 22, RAM 24, and mass storage 34 are examples of memory 19 of the processing system 100. A network adapter 26 interconnects system bus 33 with an outside network 36 enabling the processing system 100 to communicate with other such systems.

A display (e.g., a display monitor) 35 is connected to system bus 33 by display adapter 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 100 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 100 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 100.

Turning now to an overview of technologies relevant to aspects of the disclosed system, disaster recovery for a distributed computer system can include gathering a current state of one or more monitored entities, such as virtual machines, hosts, sites, and the like. Capturing a full image of the state of one or more monitored entities can involve substantial quantities of data, such as gigabytes, terabytes, or petabytes, depending on the scale of recovery supported. Since the underlying data may be updated at any time, and storage capacity may be modified by the addition or removal of disks or other memory resources, it can be challenging to keep disaster recovery data current. Periodically capturing complete copies of monitored entities can be effective but consumes a substantial quantity of network bandwidth and storage capacity for disaster recovery data.

Turning now to an overview of the aspects of the invention, one or more embodiments of the invention address the above-described shortcomings of the prior art by performing multilevel data change detection and information request in support of collecting disaster recovery data for one or more monitored entities. For example, high-level metadata can correspond to high-level information associated with a monitored entity. The high-level information can track identifiers and resource utilization for aspects shared across multiple components of a monitored entity, and the high-level metadata can be used to determine whether the high-level information has changed between iterations. Low-level information can include the components, which may be separately modified at different times. Low-level metadata can be used to determine whether specific components of the low-level information have changed between iterations. Thus, after establishing a baseline of the high and low-level information and metadata, changes to the monitored entity can be identified based on changes to the high-level metadata and low-level metadata. If no changes are detected upon a request for data, then the data need not be sent back to a disaster recovery system. If only one of a plurality of components has been modified, then only the low-level information associated with the changed component may be sent to the disaster recovery system for persistent storage. The high and low-level metadata can also be used by the disaster recovery system to validate the contents of the high and low-level information before updating the persistent storage.

The above-described aspects of the invention address the shortcomings of the prior art by using metadata, such as an entity tag and checksums, for detecting changes to high and low-level information. An entity tag can be returned, for example, in response to a GET request as part of a response header or payload and may enable a client to make conditional requests. The entity tag can indicate a date and time of a last update to the high-level information. Checksums can be used to identify changes in data values. Checksums may also be useful for identifying changes, such as an addition or removal of a disk that may not impact the entity tag, while the entity tag can be used to request checksum data and identify some types of change conditions. Technical effects and benefits can include reduced discovery time and bandwidth usage in fetching disaster recovery data.

Figure 4:
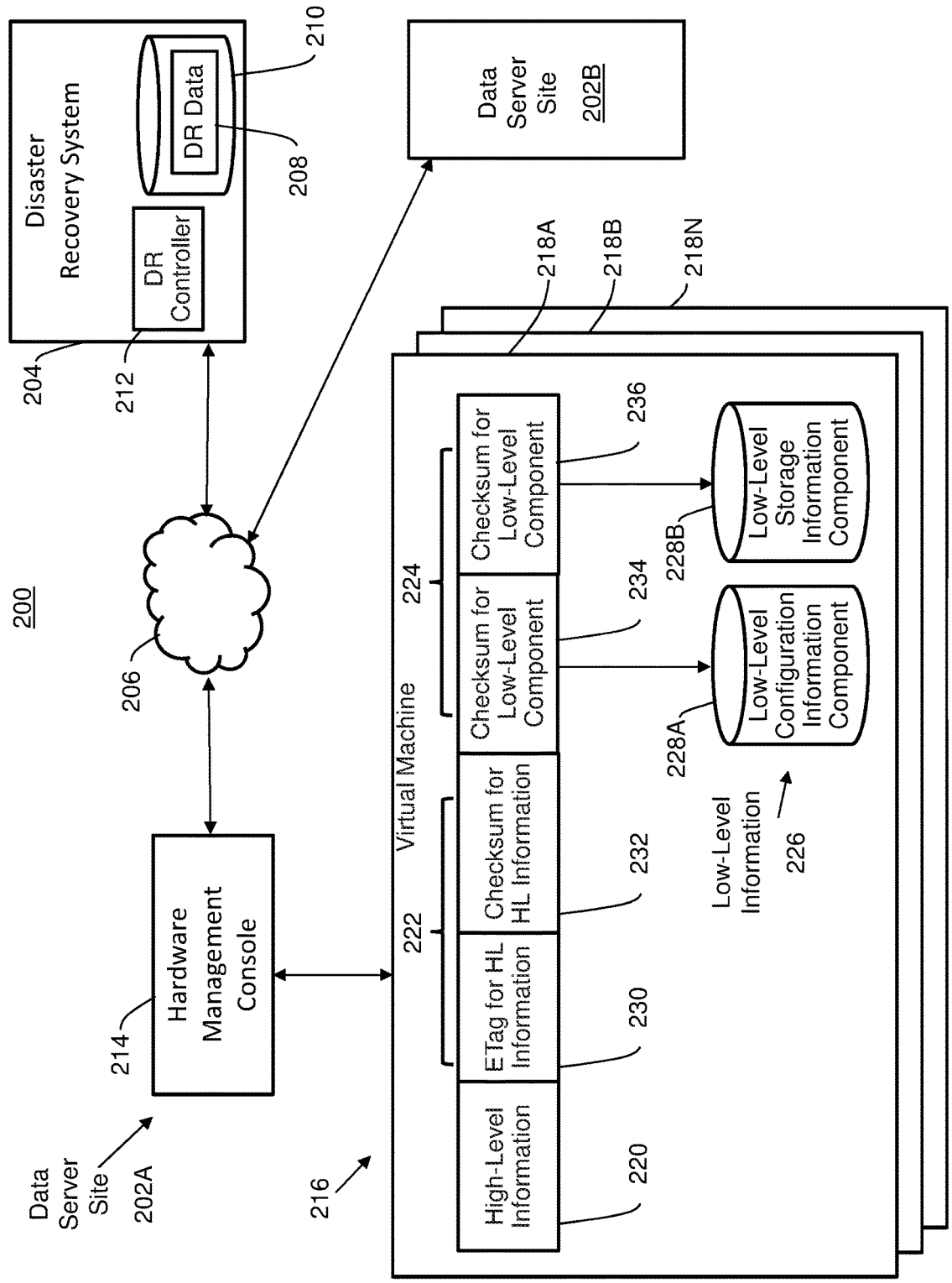
FIG. 4 depicts a block diagram of a system according to one or more embodiments of the present invention.

Turning now to a more detailed description of aspects of the present invention, FIG. 4 depicts a block diagram of a system 200 according to one or more embodiments of the present invention. The various computer components of the system 200 shown in FIG. 4 can be implemented using one or more of the cloud computing environment 50 (shown in FIG. 1), the cloud computing nodes 10 (shown in FIG. 1), and the processing system 100 shown in FIG. 3. More specifically, the system 200 can include a plurality of data server sites 202A, 202B and a disaster recovery system 204 operable to communicate over a network 206, such as network 36 of FIG. 3. In the example of FIG. 4, the disaster recovery system 204 monitors for data changes at data server site 202A to determine whether a plurality of disaster recovery data 208 stored in a persistent database 210 should be used to restore one or more entities of data server site 202A onto data server site 202B, e.g., based on a catastrophic failure at data server site 202A. The disaster recovery system 204 can include a disaster recovery controller 212 that may be an embodiment of the processing system 100 operable to perform discovery of data changes at the data server site 202A.

The data server site 202A can include a hardware management console 214, which can be an embodiment of the processing system 100 operable to interface with a plurality of monitored entities 216 at the data server site 202A. In some embodiments, the hardware management console 214 can be accessible to the disaster recovery system 204 through a cloud service (e.g., disaster recovery support 96 of FIG. 2) of a cloud computing environment 50 of FIG. 1. The monitored entities 216 can be any type of transferable element that can be monitored by the disaster recovery system 204 and restored elsewhere, such as at the data server site 202B. For instance, the monitored entities 216 can include one or more virtual machines (VMs), host systems, site-wide systems, and the like. In the example of FIG. 4, the monitored entities 216 include VM 218A, VM 218B, . . . , VM 218N, where N is an arbitrary number. VM 218A can include a plurality of high-level information 220, high-level metadata 222, low-level metadata 224, and low-level information 226. The high-level information 220 can include one or more of a virtual machine name, a virtual machine identifier, a processing resource utilization indicator, and a memory resource utilization indicator. The low-level information 226 can include a plurality of components 228A, 228B associated with a monitored entity 216 for disaster recovery. In the example of FIG. 4, the low-level information 226 includes a virtual machine configuration information component 228A and a virtual machine storage information component 228B, while additional components are contemplated.

The high-level metadata 222 can include an entity tag 230 and a checksum 232 of the high-level information 220. The low-level metadata 224 can include a checksum 234 of the virtual machine configuration information component 228A and a checksum 236 of the virtual machine storage information component 228B. The entity tag 230 can be sent to the disaster recovery system 204 responsive to a request, such as a GET request, to track when the high-level information 220 was last updated. The checksum 232 of the high-level information 220 can also be used to check for changes in the high-level information 220 and may be used for validating a subsequent instance of the high-level information 220 prior to updating the plurality of disaster recovery data 208 of the monitored entity (e.g., VM 218A) in the persistent database 210. Changes to the checksum 234 between iterations can indicate a change to the virtual machine configuration information component 228A, while changes to the checksum 236 between iterations can indicate a change to the virtual machine storage information component 228B. The examples of FIGS. 5 and 6 further indicate how the high-level information 220, high-level metadata 222, low-level metadata 224, and low-level information 226 can be used according to embodiments.

Figure 5:
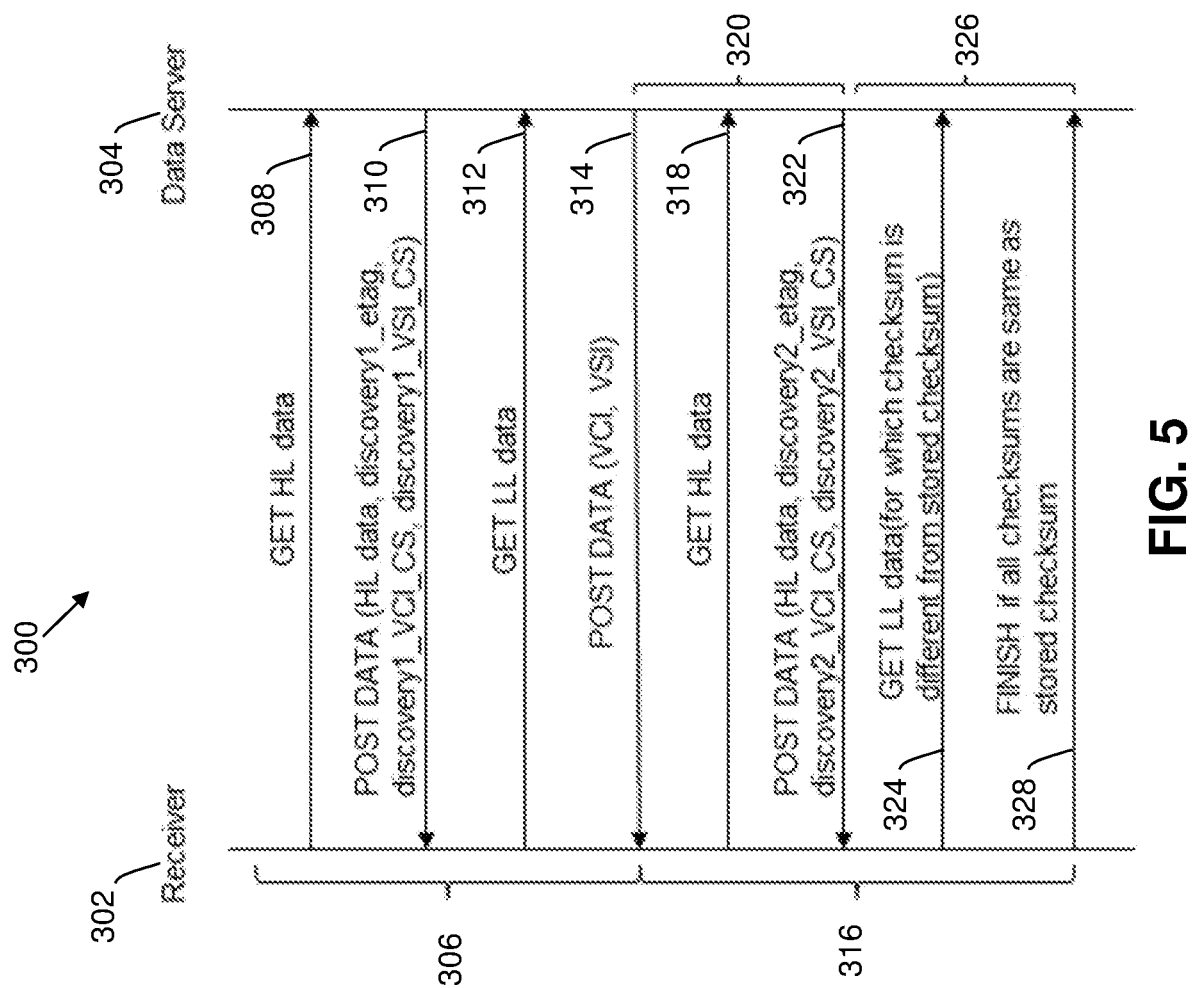
FIG. 5 depicts a sequence diagram according to one or more embodiments of the present invention.

FIG. 5 depicts a sequence diagram 300 according to one or more embodiments of the invention. The sequence diagram 300 is described with respect to FIGS. 1-4 and may include additional steps and/or be further subdivided or combined. The sequence diagram 300 can be performed by a receiver 302, such as the disaster recovery system 204, and a data server 304, such as the hardware management console 214.

The receiver 302 and data server 304 perform a first iteration of discovery 306 that can include sending a GET command 308 requesting high-level (HL) data, such as the high-level information 220, from the receiver 302 to the data server 304. The data server 304 can respond with a POST DATA message 310, which may include high-level information 220 (HL data), entity tag 230 (discovery1_etag), checksum 234 (discovery1_VCI_CS), and checksum 236 (discovery1_VSI_CS). The POST DATA message 310 may also include checksum 232 (discovery1_HL_CS). The receiver 302 may initially store the received values as a portion of the disaster recovery data 208 in the persistent database 210. The receiver 302 can send a GET command 312 requesting low-level (LL) data, such as the low-level information 226. The data server 304 can respond with a POST DATA message 314, which may include the virtual machine configuration information component 228A and the virtual machine storage information component 228B. The receiver 302 may store the received values as a portion of the disaster recovery data 208 in the persistent database 210.

During a second iteration of discovery 316, the receiver 302 can send a GET command 318 requesting a subsequent instance of the high-level information 220 (HL data) after a period of time has passed. As part of a first phase 320, the data server 304 can respond with a POST DATA message 322, which may include a subsequent instance of the high-level information 220 (HL data), entity tag 230 (discovery2_etag), checksum 234 (discovery2_VCI_CS), and checksum 236 (discovery2_VSI_CS). The POST DATA message 322 may also include a subsequent instance of checksum 232 (discovery2_HL_CS). The checksums 234 and 236 returned in the POST DATA message 322 can serve as a metadata prefetch for a second phase 326. The receiver 302 can analyze the entity tag 230 and/or the checksum 232 to determine whether a difference exists between the high-level information 220 and the subsequent instance of the high-level information 220, where the disaster recovery data 208 need not be updated if no difference exists. Alternatively, the data server 304 can determine whether a difference exists between the high-level information 220 and the subsequent instance of the high-level information 220 prior to sending the POST DATA message 322, such that the high-level information 220 can be excluded from the POST DATA message 322 if no differences are detected, thus saving communication bandwidth.

In the second phase 326, the receiver 302 can determine whether a difference exists between the checksum 234 received in POST DATA message 310 and the subsequent instance of the checksum 234 received in POST DATA message 322. The receiver 302 can also determine whether a difference exists between the checksum 236 received in POST DATA message 310 and the subsequent instance of the checksum 236 received in POST DATA message 322. If no differences are detected, then no further requests for low-level data are needed. However, if at least one difference is detected, the receiver 302 can send a GET command 324 for LL data requesting a changed portion the low-level information 226, such as either or both of the virtual machine configuration information component 228A and the virtual machine storage information component 228B. Upon receiving any LL data or determining that no updated LL data is needed, the receiver 302 may send a FINISH command 328 to the data server 304 indicating that no further information is needed. The checksums 232, 234, and 236 can be used, for instance, by the disaster recovery system 204 to validate that the high-level information 220 and low-level information 226 received are not corrupted prior to storage in the disaster recovery data 208 of the persistent database 210.

Figure 6:
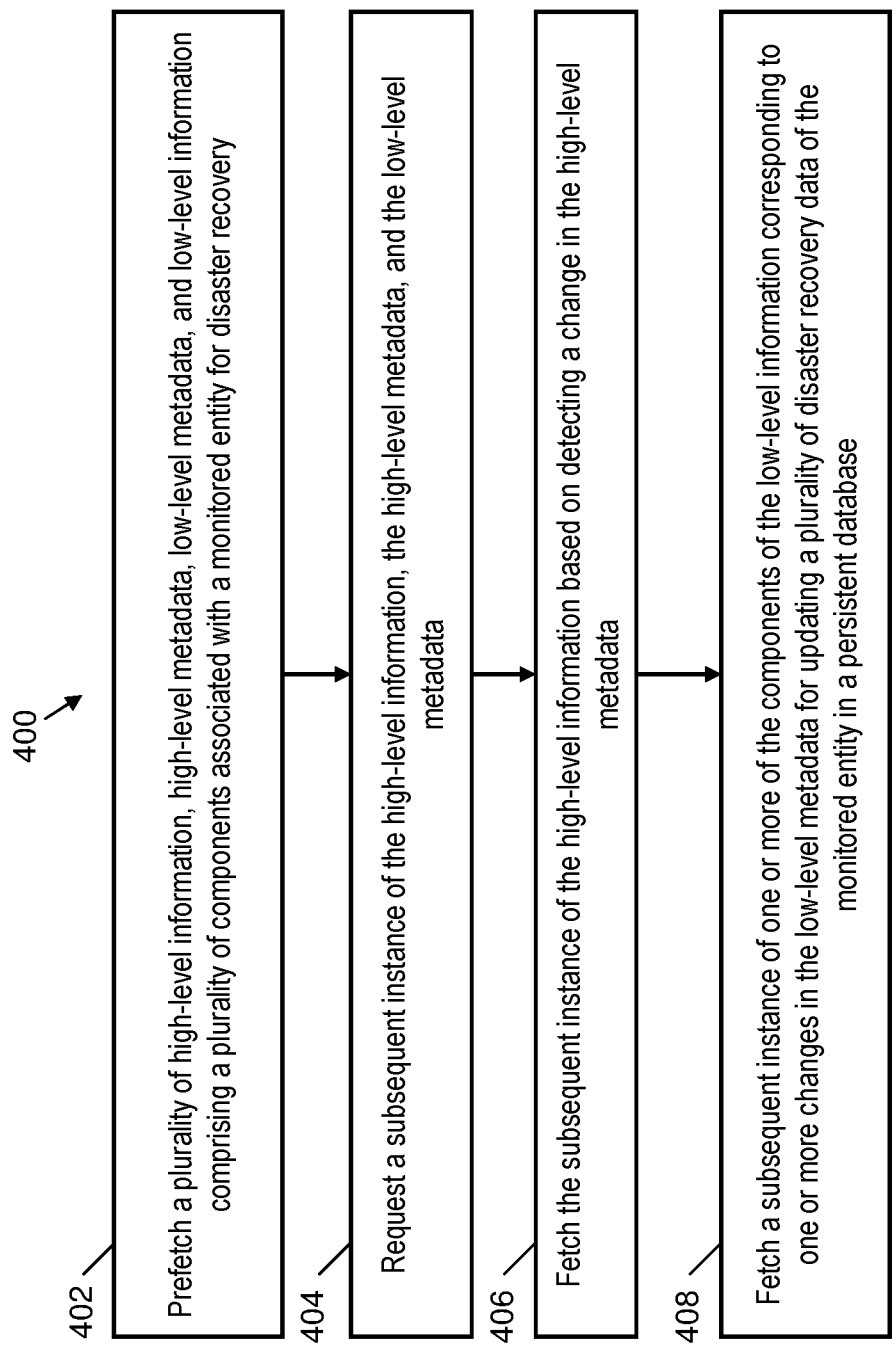
FIG. 6 depicts a flow diagram of a method according to one or more embodiments of the present invention.

FIG. 6 depicts a flow diagram of a method 400 according to one or more embodiments of the invention. The method 400 is described with respect to FIGS. 1-5 and may include additional steps and/or be further subdivided or combined. The method 400 can be performed by the hardware management console 214 in conjunction with the disaster recovery system 204, which may include a cloud-based implementation.

At block 402, a plurality of high-level information 220, high-level metadata 222, low-level metadata 224, and low-level information 226 is prefetched, for instance, from VM 218A through the hardware management console 214. The low-level information 226 can include a plurality of components associated with a monitored entity 216 for disaster recovery, such as virtual machine configuration information component 228A and/or virtual machine storage information component 228B. The high-level metadata 222 can include an entity tag 230 and a checksum 232 of the high-level information 220.

At block 404, a subsequent instance of the high-level information 220, the high-level metadata 222, and the low-level metadata 224 are requested. The request may be received from the disaster recovery system 204. At block 406, the subsequent instance of the high-level information 220 is fetched based on detecting a change in the high-level metadata 222. The fetching may be performed by the hardware management console 214. In some embodiments, the disaster recovery system 204 may receive an entity tag 230 as part of the prefetching of block 402 and can incorporate the entity tag 230 in the subsequent instance of the high-level information 220 to the hardware management console 214. The hardware management console 214 can compare a received instance of the entity tag 230 to a calculated instance of the entity tag 230 associated with any updates to the high-level information 220. The checksum 232 of the high-level information 220 can be compared to the checksum 232 of the subsequent instance of the high-level information 220. The change in the high-level metadata 222 can be detected in block 406 based on one or more of: a mismatch between the received instance of the entity tag 230 and the calculated instance of the entity tag 230, and a mismatch between the checksum 232 of the high-level information 220 and the checksum 232 of the subsequent instance of the high-level information 220. The entity tag 230, the checksum 232 of the high-level information 220, and the low-level metadata 224 can be returned based on detecting no change in the high-level metadata 222. The subsequent instance of the high-level information 220 can be validated based on the checksum 232 of the subsequent instance of the high-level information 220 prior to updating the plurality of disaster recovery data 208 of the monitored entity 216 in the persistent database 210.

At block 408, a subsequent instance of one or more of the components of the low-level information 226 corresponding to one or more changes in the low-level metadata 224 can be fetched for updating a plurality of disaster recovery data 208 of the monitored entity 216 in a persistent database 210. For instance, changes in the virtual machine configuration information component 228A may only be written to the disaster recovery data 208 based on changes detected to the checksum 234. Similarly, changes to the virtual machine storage information component 228B may only be written to the disaster recovery data 208 based on changes detected to the checksum 236.

Additional processes also can be included, and it should be understood that the processes depicted herein represent illustrations and that other processes can be added or existing processes can be removed, modified, or rearranged without departing from the scope and spirit of one or more embodiments of the present invention.

The present techniques can be implemented as a system, a method, and/or a computer program product. The computer program product can include a computer readable storage medium (or media) having computer readable program instructions thereon for causing a processor to carry out aspects of one or more embodiments of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of one or more embodiments of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments of the present invention.

Aspects of one or more embodiments of the present invention are described herein with reference to flowchart illustrations and/or block diagrams of methods, apparatus (systems), and computer program products according to one or more embodiments of the present invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of one or more embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method comprising:
prefetching a plurality of high-level information, high-level metadata, low-level metadata, and low-level information comprising a plurality of components associated with a monitored entity for disaster recovery;
requesting a subsequent instance of the high-level information, the high-level metadata, and the low-level metadata;
fetching the subsequent instance of the high-level information based on detecting a change in the high-level metadata; and
fetching a subsequent instance of one or more of the components of the low-level information corresponding to one or more changes in the low-level metadata for updating a plurality of disaster recovery data of the monitored entity in a persistent database,
wherein the high-level information comprises one or more of a virtual machine name, a virtual machine identifier, a processing resource utilization indicator, and a memory resource utilization indicator;
wherein the high-level metadata comprises an entity tag and a checksum of the high-level information;
wherein the low-level information comprises a virtual machine configuration information component and a virtual machine storage information component; and
wherein the low-level metadata comprises a checksum of the virtual machine configuration information component and a checksum of the virtual machine storage information component.

2. The computer-implemented method of claim 1, further comprising:
comparing a received instance of the entity tag to a calculated instance of the entity tag;
comparing the checksum of the high-level information to the checksum of the subsequent instance of the high-level information; and
detecting the change in the high-level metadata based on one or more of: a mismatch between the received instance of the entity tag and the calculated instance of the entity tag, and a mismatch between the checksum of the high-level information and the checksum of the subsequent instance of the high-level information.

3. The computer-implemented method of claim 2 further comprising:
returning the entity tag, the checksum of the high-level information, and the low-level metadata based on detecting no change in the high-level metadata.

4. The computer-implemented method of claim 2 further comprising:
validating the subsequent instance of the high-level information based on the checksum of the subsequent instance of the high-level information prior to updating the plurality of disaster recovery data of the monitored entity in the persistent database.

5. The computer-implemented method of claim 1 wherein the method is implemented as a cloud service of a cloud computing environment.

6. A system comprising:
a virtual machine comprising a plurality of high-level information and low-level information, the low-level information comprising a plurality of components; and
a hardware management console configured to perform a method comprising:
prefetching the high-level information, the low-level information, a plurality of high-level metadata associated with the high-level information, and a plurality of low-level metadata associated with the low-level information responsive to a disaster recovery system;
requesting a subsequent instance of the high-level information, the high-level metadata, and the low-level metadata responsive to the disaster recovery system;
fetching the subsequent instance of the high-level information based on detecting a change in the high-level metadata; and
fetching a subsequent instance of one or more of the components of the low-level information corresponding to one or more changes in the low-level metadata for updating a plurality of disaster recovery data of the virtual machine in a persistent database of the disaster recovery system,
wherein the high-level information comprises one or more of a virtual machine name, a virtual machine identifier, a processing resource utilization indicator, and a memory resource utilization indicator;
wherein the high-level metadata comprises an entity tag and a checksum of the high-level information;
wherein the low-level information comprises a virtual machine configuration information component and a virtual machine storage information component; and
wherein the low-level metadata comprises a checksum of the virtual machine configuration information component and a checksum of the virtual machine storage information component.

7. The system of claim 6, wherein the hardware management console is further configured to perform:
comparing a received instance of the entity tag to a calculated instance of the entity tag;
comparing the checksum of the high-level information to the checksum of the subsequent instance of the high-level information; and
detecting the change in the high-level metadata based on one or more of: a mismatch between the received instance of the entity tag and the calculated instance of the entity tag, and a mismatch between the checksum of the high-level information and the checksum of the subsequent instance of the high-level information.

8. The system of claim 7, wherein the hardware management console is further configured to perform:
returning the entity tag, the checksum of the high-level information, and the low-level metadata to the disaster recovery system based on detecting no change in the high-level metadata.

9. The system of claim 7, wherein the subsequent instance of the high-level information is validated based on the checksum of the subsequent instance of the high-level information prior to updating the plurality of disaster recovery data of the virtual machine in the persistent database.

10. The system of claim 6, wherein the hardware management console is accessible to the disaster recovery system through a cloud service of a cloud computing environment.

11. A computer program product comprising:
a computer readable storage medium having program instructions embodied therewith, the program instructions executable by a processing device to cause the processing device to perform a method comprising:
prefetching a plurality of high-level information, high-level metadata, low-level metadata, and low-level information comprising a plurality of components associated with a monitored entity for disaster recovery;

requesting a subsequent instance of the high-level information, the high-level metadata, and the low-level metadata;
fetching the subsequent instance of the high-level information based on detecting a change in the high-level metadata; and
fetching a subsequent instance of one or more of the components of the low-level information corresponding to one or more changes in the low-level metadata for updating a plurality of disaster recovery data of the monitored entity in a persistent database,
wherein the high-level information comprises one or more of a virtual machine name, a virtual machine identifier, a processing resource utilization indicator, and a memory resource utilization indicator;
wherein the high-level metadata comprises an entity tag and a checksum of the high-level information;
wherein the low-level information comprises a virtual machine configuration information component and a virtual machine storage information component; and
wherein the low-level metadata comprises a checksum of the virtual machine configuration information component and a checksum of the virtual machine storage information component.

12. The computer program product of claim 11, wherein the program instructions executable by the processing device further cause the processing device to perform:
comparing a received instance of the entity tag to a calculated instance of the entity tag;
comparing the checksum of the high-level information to the checksum of the subsequent instance of the high-level information; and
detecting the change in the high-level metadata based on one or more of: a mismatch between the received instance of the entity tag and the calculated instance of the entity tag, and a mismatch between the checksum of the high-level information and the checksum of the subsequent instance of the high-level information.

13. The computer program product of claim 12, wherein the program instructions executable by the processing device further cause the processing device to perform:
returning the entity tag, the checksum of the high-level information, and the low-level metadata based on detecting no change in the high-level metadata.

14. The computer program product of claim 11, wherein the program instructions comprise a cloud service of a cloud computing environment.

* * * * *